Aug. 27, 1957     R. G. CHAUVEL     2,804,359
ADJUSTABLE BEARING
Filed Aug. 6, 1956
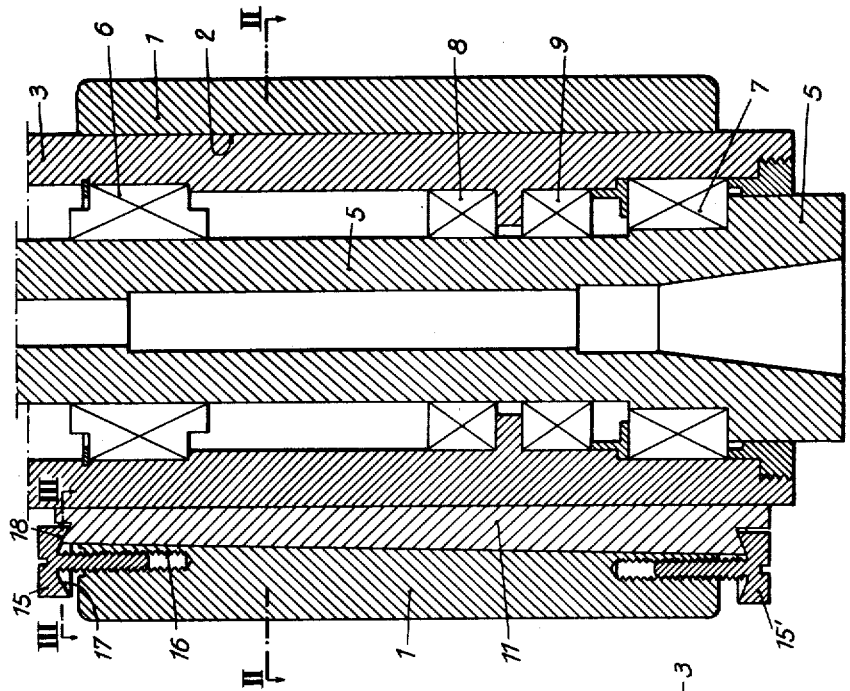
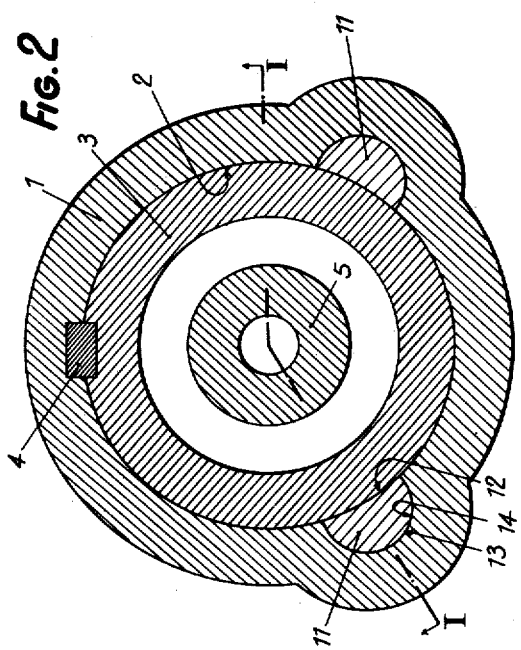
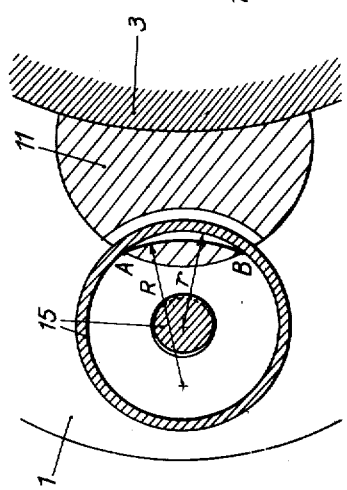
Inventor:
Raymond G. Chauvel
by: J. Delattre-Seguy
Attorney

United States Patent Office 2,804,359
Patented Aug. 27, 1957

2,804,359
ADJUSTABLE BEARING

Raymond G. Chauvel, Velizy, France, assignor to Societe a Responsabilité Limiteé dite: Gambia & Cie, Billancourt (Seine), France Application August 6, 1956, Serial No. 602,290
Claims priority, application France March 23, 1956
4 Claims. (Cl. 308—236)

The present invention relates to adjustable bearings and, more particularly though not exclusively, to adjustable bearings for reciprocating shafts.

One object of the invention is to provide a bearing of the aforesaid type of simple and sturdy construction and the design of which enables a great accuracy to be achieved in the machining of the adjustable device as well as in its adjustment.

An adjustable bearing according to the invention is characterized in that it comprises at least one longitudinal wedge bounded by two surfaces one of which coincides with the cylindrical surface of the shaft and the other is a surface with parallel generatrices which intersects the former and the generatrices of which form a small angle with those of the first surface, said wedge being housed within a longitudinal groove of complementary cross-section in the bearing and longitudinally retained, at each end thereof, by the hollow frusto-conical underside face of the head of a screw mounted in the bearing, said hollow frusto-conical surface bearing against the corresponding end face of the wedge machined into a complementary frusto-conical surface.

As a rule, the second surface with parallel generatrices is also a cylindrical surface which may be readily machined and ground to precision, and the diameter of which is much smaller than that of the first aforesaid cylindrical surface.

In a preferred embodiment, in each plane normal to the axis of said conical surfaces, the radius of curvature of the hollow conical surface of the screw head is smaller than the radius of curvature of the conical surface of the wedge. By virtue of this feature, the wedge is firmly held in its housing and it is possible to carry out simultaneously final grinding of the bore of the bearing and of the portion of cylindrical surface of the wedge adapted to cooperate with the shaft. Thus a great accuracy is secured in guiding the shaft.

Further objects and advantages of the invention will be apparent to those skilled in the art, from a consideration of the following description of one specific embodiment of the invention, shown by way of example in the accompanying drawings, in which:

Fig. 1 is a longitudinal section taken on line I—I of Fig. 2 of an adjustable bearing according to the invention adapted to guide a spindle carrying sleeve of an auxiliary milling and boring head adapted to be mounted on a milling machine.

Fig. 2 is a transverse section taken on line II—II of Fig. 1, and

Fig. 3 is a fragmentary section, on a larger scale, taken on line III—III of Fig. 1.

Referring now to the drawings, 1 denotes a portion of an auxiliary milling and boring head adapted to be mounted on a milling machine for instance. The head 1 has a ground cylindrical bore 2 in which a sleeve 3 is adapted to slide longitudinally and held against rotation by a feather 4. The sleeve 3 serves as a support for a rotary spindle 5 mounted therein by any suitable conventional means such as, for instance, antifriction journal bearings 6, 7 and thrust bearings 8, 9. The spindle 5 is adapted to receive tools such as milling and boring cutters, drills or the like.

In order to eliminate any backlash between the sleeve 3 and the bore 2 of the head, two wedges 11 of particular design are distributed over a semi-circle of said bore and serve for permanently maintaining the sleeve in close engagement with the opposite semi-circle of said bore.

Each wedge 11 is bounded by two cylindrical surfaces intersecting each other. The first of said two surfaces is a surface which strictly coincides with the outer cylindrical surface of the sleeve 3 and which is indicated as at 12 in the drawings.

The second surface 13 is a portion of a cylindrical surface with a diameter much smaller than the diameter of the first surface 12 and the axis of which is slightly inclined to the axis of said first surface, i. e. to the common axis of the sleeve and of the bore 2 of the bearing. This inclination or taper may be for instance of the order of 2%. The wedges 11 may slide without any play in grooves 14 of the head 1.

Each wedge is supported at each end thereof by the head of a screw 15 the stem of which is in screwing engagement with a tapped hole 16 of the bearing 1. The axis of the screw is preferably parallel with the axis of the sleeve 3.

The underside of the head of the screw 15 is in the shape of a hollow frusto-conical surface 17 and bears against the corresponding end portion of the wedge machined into a portion of mating complementary frusto-conical surface 18.

In order that the orientation of the wedge in its cylindrical recess be strictly secured, the radius $r$ (Fig. 3) of the frusto-conical surface of the screw head, in a reference plane at right angles to its axis, is shorter than the radius $R$ of the frusto-conical surface of the end portion of the wedge, as considered in the same reference plane, when both surfaces are in mutual engagement. It will be seen that, by virtue of this disposition, the screw head bears against the conical surface of the wedge on two generatrices extending through points A and B respectively. Since these generatrices are the most remote from each other on the conical surface of the wedge, it is clear that the latter is clamped and held under the best possible conditions when both screws 15 are turned tight against it.

Furthermore, and this is still more important, it will be understood that even though the sleeve were not in place within the body 1, the wedges are made strictly rigid with the body, so that it is possible to carry out the finishing operations, including grinding the cylindrical surface 12 of the wedges simultaneously with finishing the bore 12 of the body 1 itself. The work, therefore, could not be achieved under more favorable conditions for securing an accurate fit.

The adjustment of the device hereinabove described is self explanatory: any slight clearance between the sleeve and the bore of the bearing 1 may be readily eliminated by slightly releasing the upper screw 15 and tightening the lower screw 15' by the same amount, whereby the wedge 11 is correspondingly driven somewhat more deeply. Both wedges are acted upon in this manner.

As many changes could be made in the above construction, and many widely different embodiments of this invention could be made without departing from the scope of the claims, it is intended that all matter contained in the above description or shown in the accompanying drawings shall be interpreted as illustrative and not in a limiting sense.

Thus, in the embodiment described, it has been assumed that the wedges were two in number, but similar devices could be designed with a single wedge or a number of wedges in excess of two. Three wedges, for instance, could be provided, spaced apart 120°, which enables the sleeve 3 to be shifted in a direction transverse to its axis in order to make up, for instance, for a slight misalignment. For this purpose, it would be sufficient individually to shift the three wedges by the required amounts and in the suitable directions.

Furthermore, the recesses for the wedges could assume a polygonal cross-section instead of the section in a portion of a circle as hereinabove described; the circular section, however, was selected because it is more readily obtained with a great accuracy by means of a grinding operation.

What I claim is:

1. An adjustable bearing for a cylindrical shaft comprising in combination an encircling sleeve through which the shaft is adapted to pass with a sliding fit, at least one longitudinal wedge bounded by two surfaces one of which coincides with the bore of the sleeve and the other is a surface with parallel generatrices which intersects the former, the generatrices of said second surface forming a small angle with the generatrices of said first surface, said wedge being accurately and slidably fitted within a longitudinal groove of complementary cross-section cut in said sleeve, and a pair of longitudinal adjusting screws respectively positioned near the ends of said wedge in screw threaded engagement with said sleeve and the heads of which have their annular underface in the shape of a hollow frusto-conical surface, the end faces of said wedge being each in the shape of a portion of a frusto-conical surface in engagement with said hollow frusto-conical surface of said adjusting screws.

2. An adjustable bearing according to claim 1, wherein the second aforesaid surface with parallel generatrices is also a cylindrical surface the diameter of which is much smaller than that of the first aforesaid cylindrical surface.

3. An adjustable bearing according to claim 1, wherein in each plane normal to the axis of said conical surfaces, the radius of curvature of the hollow conical surface of the screw head is smaller than the radius of curvature of the conical surface of the wedge.

4. An adjustable bearing according to claim 1, wherein a plurality of wedges are distributed over one half only of the circle determined by the transverse section of the shaft.

References Cited in the file of this patent

UNITED STATES PATENTS

| 681,090 | White | Aug. 20, 1901 |
| 1,464,922 | Close | Aug. 14, 1923 |
| 2,377,035 | Pixley | May 29, 1945 |

UNITED STATES PATENT OFFICE

CERTIFICATE OF CORRECTION

Patent No. 2,804,359                        August 27, 1957

Raymond G. Chauvel

It is hereby certified that error appears in the above numbered patent requiring correction and that the said Letters Patent should read as corrected below.

In the grant, lines 2 and 12, and in the heading to the printed specification, line 4, name of assignee, for "Gambia & Cie," read -- Gambin & Cie,--.

Signed and sealed this 5th day of November 1957.

(SEAL)

Attest:

KARL H. AXLINE

Attesting Officer

ROBERT C. WATSON
Commissioner of Patents